(12) United States Patent
Brinton

(10) Patent No.: US 9,842,328 B2
(45) Date of Patent: Dec. 12, 2017

(54) MONITOR TRACKING OF PAYMENT COMPLIANCE

(71) Applicant: James F Brinton, Redmond, WA (US)

(72) Inventor: James F Brinton, Redmond, WA (US)

(*) Notice: Subject to any disclaimer, the term of this patent is extended or adjusted under 35 U.S.C. 154(b) by 0 days.

(21) Appl. No.: 14/664,344

(22) Filed: Mar. 20, 2015

(65) Prior Publication Data

US 2015/0269551 A1 Sep. 24, 2015

Related U.S. Application Data

(60) Provisional application No. 61/968,607, filed on Mar. 21, 2014.

(51) Int. Cl.
| | | |
|---|---|---|
| *G06K 7/10* | (2006.01) | |
| *G06Q 20/20* | (2012.01) | |
| *G06Q 20/18* | (2012.01) | |

(52) U.S. Cl.
CPC ......... *G06Q 20/209* (2013.01); *G06Q 20/18* (2013.01)

(58) Field of Classification Search
CPC ....... G06Q 20/18; G06Q 20/20; G06Q 20/209
USPC .................................................. 235/462.43
See application file for complete search history.

(56) References Cited

U.S. PATENT DOCUMENTS

| | | |
|---|---|---|
| 2008/0226129 A1 | 9/2008 | Kundu et al. |
| 2011/0099044 A1* | 4/2011 | Mediano ............... G06Q 30/00 705/7.29 |

FOREIGN PATENT DOCUMENTS

| | | | |
|---|---|---|---|
| JP | 2007293764 | * | 11/2007 |
| JP | 2010-237886 A | | 10/2010 |
| JP | 2011-054038 A | | 3/2011 |
| JP | 2013-186875 A | | 9/2013 |
| KR | 10-2011-0122890 A | | 11/2011 |

* cited by examiner

*Primary Examiner* — Laura Gudorf
(74) *Attorney, Agent, or Firm* — P.G. Scott Born; Foster Pepper PLLC

(57) ABSTRACT

A system includes a transaction-processing kiosk located in a predefined retail space. The kiosk is configured to enable a first human user to execute a current purchase transaction involving at least one of a set of retail items selected from the predefined retail space. The current purchase transaction is executed without participation by a second human, such as a cashier. The system further includes at least one display device having a screen and in signal communication with the kiosk. The at least one display device is configured such that the screen simultaneously displays a predetermined number of descriptions of retail items the subject of purchase transactions with the kiosk that were executed prior to execution of the current purchase transaction by a plurality of different human users. The at least one display device is positioned such that the screen is viewable by all parties present in the retail space.

19 Claims, 4 Drawing Sheets

MONITOR TRACKING OF PAYMENT COMPLIANCE

PRIORITY CLAIM

This application claims the benefit of and incorporates by reference in its entirety U.S. Provisional Appl. No. 61/968,607 filed Mar. 21, 2014.

BACKGROUND OF THE INVENTION

In the following discussion, the terms "activity" and "transaction" are used for illustrative purposes. In general, activities relate to automated or electronic interactions with hardware devices or software programs, such as accessing computer systems or online web sites. Transactions relate to automated or electronic transactions, such as personal data transactions or financial transactions such as payments, fund-transfers, fund withdrawals, deposits, changes to account information, etc. Also, the terms "entity," "party," or "user" are used for illustrative purposes. In general, entities, users or parties requiring executing transactions are human individuals.

An increasingly popular food and beverage vending arrangement involves the use of an automated device, such as a payment kiosk, that enables a user to pay for items that he has selected from a retail area or space without involving a human cashier of other attendant either assisting with the sales transaction or, perhaps, even monitoring the progress of such a transaction. However, such an unmonitored situation invites theft of the items selected from the retail space. Consequently, what is needed is an approach to this arrangement that discourages, if not prevents, such potential theft.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Figure 1:
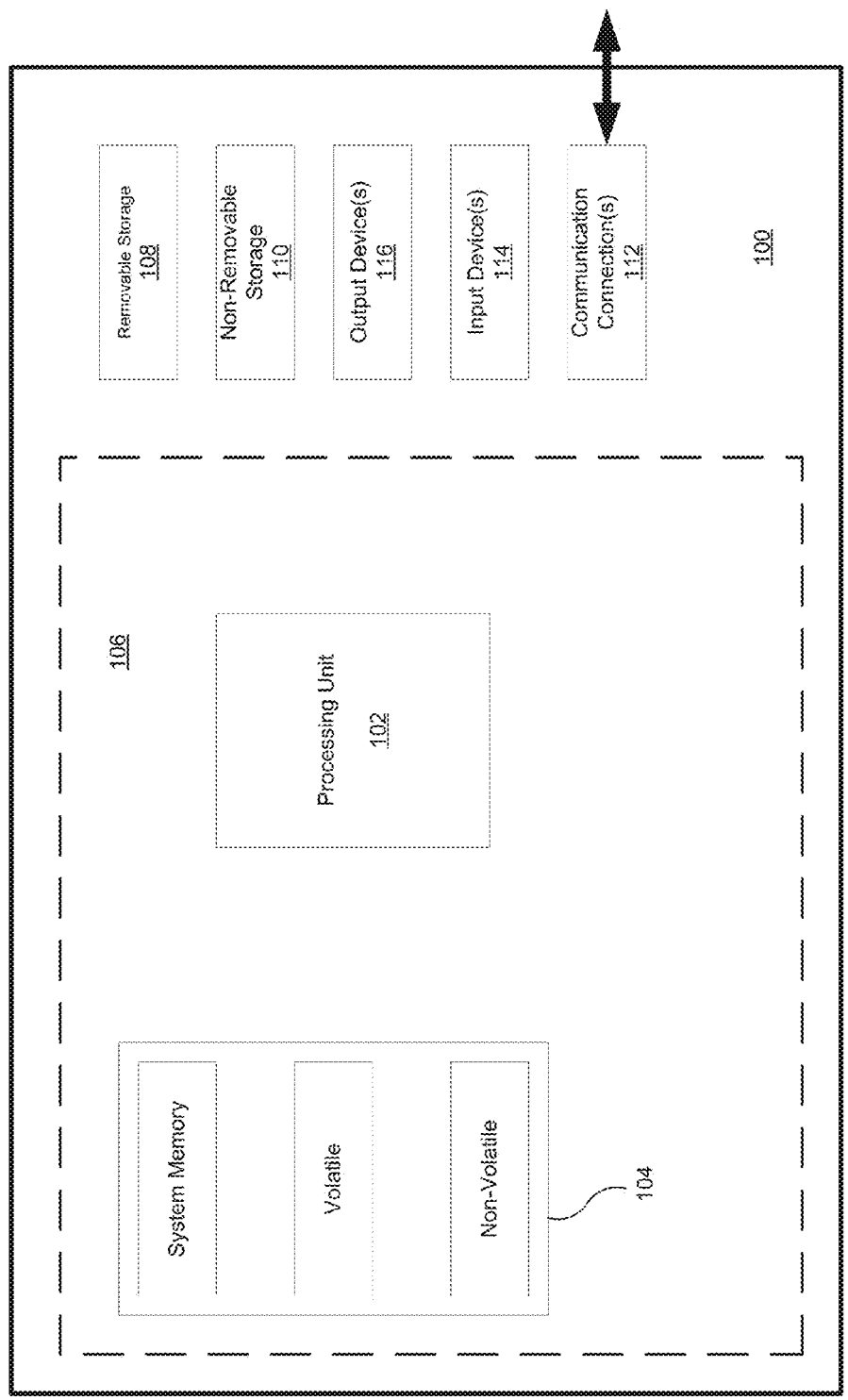
FIG. 1 illustrates an example of a computing system environment in which an embodiment of the invention may be implemented.

FIG. 1 illustrates an example of a computing system environment 100 in which an embodiment of the invention may be implemented. The computing system environment 100, as illustrated, is an example of a suitable computing environment; however it is appreciated that other environments, systems, and devices may be used to implement various embodiments of the invention as described in more detail below.

Embodiments of the invention are operational with numerous general-purpose or special purpose computing system environments or configurations. Examples of well-known computing systems, environments, and/or configurations that may be suitable for use with embodiments of the invention include, but are not limited to, personal computers, server computers, hand-held or laptop devices, multi-processor systems, microprocessor-based systems, set-top boxes, programmable consumer electronics, network PCs, minicomputers, mainframe computers, distributed computing environments that include any of the above systems or devices, payment devices, such as payment kiosks, used, for example, in a self-check-out retail system, and the like.

Embodiments of the invention may be described in the general context of computer-executable instructions, such as program modules being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices. Additionally, the entity that may implement, or otherwise provide the ability to implement, elements of embodiments of the invention may be referred to herein as an "administrator."

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 2:
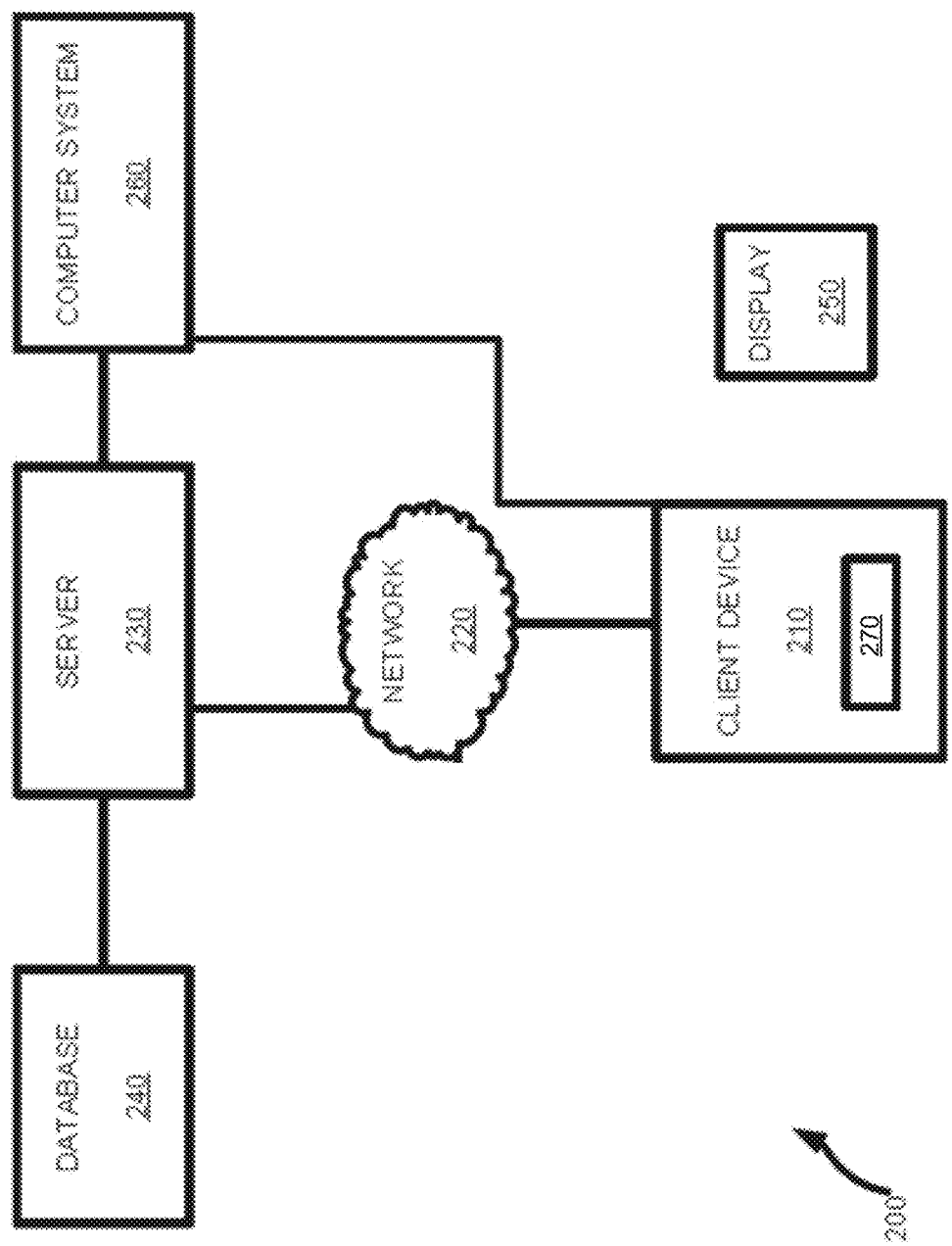
FIG. 2, illustrates an exemplary computer network system, one or more elements of which an embodiment of the invention may take the form of and/or may be implemented using.

Referring now to FIG. 2, an embodiment of the present invention may take the form, and/or may be implemented using one or more elements, of an exemplary computer network system 200. The system 200 includes an electronic client device 210, such as a personal computer or workstation, tablet or smart phone, or payment kiosk that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled, via wired or wireless connection, to a computer screen or display 250. The client device 210 may be used for various purposes such as network- and local-computing processes.

The client device 210 is linked via the network 220 to server 230 so that computer programs, such as, for example, a browser or other software application, executed by the client device 210 can cooperate in two-way communication with server 230. The server 230 may be coupled to database 240 to retrieve information therefrom and to store information thereto. Database 240 may have stored therein data (not shown) that can be used by the server 230 and/or client device 210 to enable performance of various aspects of embodiments of the invention. The data stored in database 240—or, alternatively, in one or more of client device 210, server 230 and/or computer system—may include, for example, a list of items available for retail sale, prices of such items, and/or the location of such items within a defined retail market space within which customers may hand select such items and as may be determined or corroborated by one or more scanning instruments such as closed-circuit cameras, for example, trained on such retail market space. Additionally, the server 230 may be coupled to the computer system 260 in a manner allowing the server to delegate certain processing functions to the computer system. In an embodiment, most or all of the functionality described herein may be implemented in a desktop/native application 270 that may include one or more executable modules stored on (or otherwise accessible to) and/or executed by client device 210. In an embodiment, the client device 210 may bypass network 220 and communicate directly with computer system 260.

In an embodiment, the client device 210 is used by customers purchasing items from the market space as a check-out kiosk with which the customers may interact using, for example, application 270 to select (i.e., scan in an item using the item's barcode or the like to register the item for purchase) and pay for such items in a known manner such as, for example, use of a credit/debit card, a declining-balance card, payroll deduction, or the like. In alternative embodiments, such a kiosk 210 may or may not be attended by a person physically located within the defined retail market space and monitoring the kiosk and/or market space.

As alluded to above, and in an embodiment, the display 250 is in signal communication with the client device 210 and is positioned in a manner such that customers within or proximal to the market space are able to view elements presented on the screen of the display. The display 250 can present on its screen the last predetermined number of transactions (e.g., last 25 sales transactions) involving customer selection and payment for retail items using the kiosk client device 210. The information displayed on the screen of display 250 may include, for example, identification of item sold, quantity of the item sold, time at which item was sold, per-item price as sold, and/or total sale price of items sold (collectively, "purchased-item information").

The information displayed on the screen of display 250 may further include, for example, recent transactions that were cancelled at the kiosk client device 210. This may include displaying identification of items that were scanned by kiosk client device 210, but for which subsequent payment is not made by the customer who caused the item to be scanned. The cancelled-item information displayed on the screen of display 250 may include, for example, identification of item scanned, quantity of the item scanned, time at which item was scanned, per-item price as scanned, and/or total sale price of items scanned (collectively, "cancelled-item information"). The cancelled-item information may be displayed in a highlighted or other distinguishing format, such as denoting each such entry with an "x" or the like displayed next to it. An example of such an entry is illustrated by description 420 in FIG. 4, discussed in greater detail below.

In varying embodiments, the screen of display 250 may be configured to show only one, but not both, of the purchased-item information and cancelled-item information, or show both sets of information, either separately or together, in a list-type format. For purposes of the ensuing discussion, the term "purchase transaction" shall include actions by a user that generate either purchased-item information or canceled-item information as are described above.

The above-described approach can be used not only to convey to customers in and around the market space which items are the latest-selling, but also as a deterrent against item theft in these market-space locations. This deterrent effect would arise from the fact that all items that have been paid for, either using a credit/debit card, a declining-balance card, payroll deduction, or the like in conjunction with the client device 210 directly or by a mobile payment method using a software application executed by, for example, a smart phone or tablet according to an alternative embodiment, would be shown on the display 250. The client device 210 and application 270 may be interfaced to one or more of the aforementioned scanning instruments trained on the retail market space, as well as one or more devices operable to store video captured by such scanning instruments. Consequently, a visual record of transactions occurring within a predetermined period of time and involving the client device 210 and/or market space would be available to a proprietor of the market space for later viewing and payment-compliance auditing as a means of determining which customers visiting the market space may have neglected to pay for one or more items retrieved therefrom.

Figure 3:
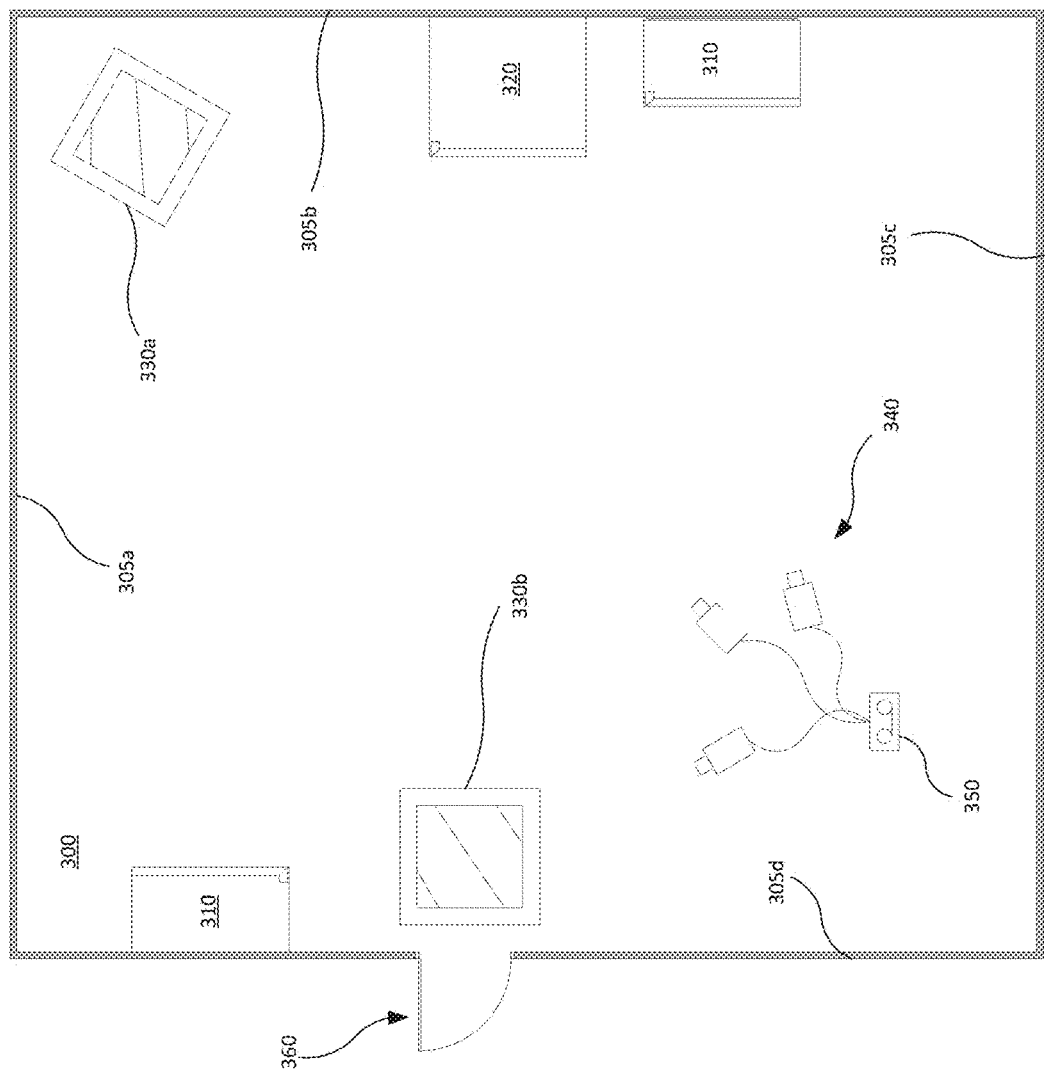
FIG. 3, illustrates a retail area or space according to an embodiment of the invention.

More particularly, and referring now to FIG. 3, illustrated is a system according to an embodiment that includes a transaction-processing kiosk 320, which may be functionally identical to kiosk client device 210 and includes a processing device configured to execute machine-readable instructions, located in a predefined retail space 300. In the illustrated embodiment, the retail space 300 is defined by four walls 305a-d, with access to the retail space provided by a door 360. In alternative embodiments, the retail space 300 may be defined by more or fewer than four walls and may be accessed by more than one door. Retail space 300 further specifically excludes any human/cashier-attended checkout stations such as may be found in conventional retail stores.

The kiosk 320 is configured to enable a first human user (not shown) to execute a current (i.e., latest-in-time) purchase transaction involving at least one of a set of retail items (not shown), such as food and/or beverage items, by using kiosk to scan identify and pay for the at least one item. The user may select the retail items from item-dispensing devices 310 such as, for example, refrigeration units or display shelving located within the retail space 300. In the illustrated embodiment, the current purchase transaction is executed without participation by, or even perhaps the presence of, a second human, such as a cashier or other attendant.

An embodiment may further include a set of cameras 340 trained on various features, such as the kiosk 320, door 360 and/or dispensing devices 310, the images captured by which may be viewable on display devices (not shown) that may or may not be present in retail space 300. Cameras 340 may further be coupled to a recording device 350, which also may or may not be present in retail space 300, configured to record the images captured by the cameras.

Figure 4:
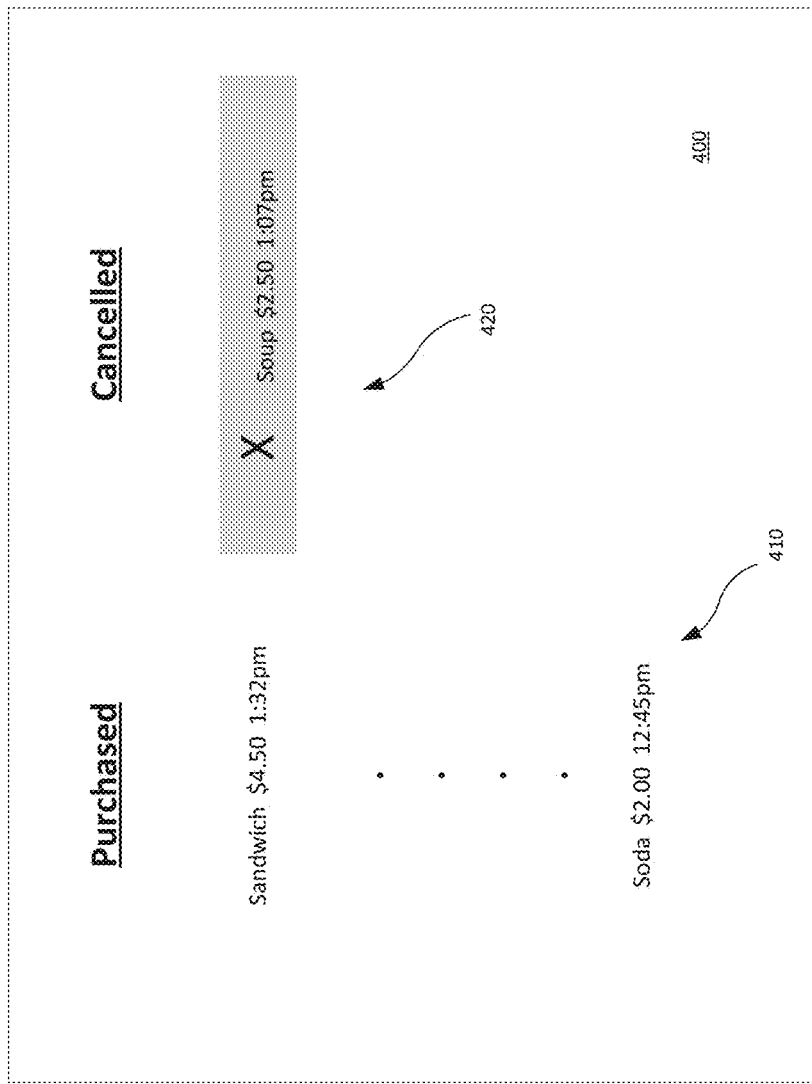
FIG. 4, illustrates an exemplary screenshot from a display device illustrated in FIG. 3.

The illustrated embodiment further includes display devices 330a, 330b located within the retail space 300, each having a screen (400, as illustrated in FIG. 4) and in signal communication with the kiosk 320. In alternative embodiments, more than two display devices or only one display device may be located in the retail space 300.

Referring now to FIG. 4, purchase transaction information supplied by kiosk 320 enables display devices 330a, 330b to simultaneously display on screen 400 a predetermined number of descriptions 410, 420 of retail items that were sold, using the kiosk 320, to a plurality of human users, different from the first human user, prior to consummation of the current purchase transaction discussed above. As illustrated in FIG. 4, descriptions 410, 420 include identification of the type of item the subject of the transaction, the price of the item and the time of day at which the purchase transaction for the item was made. Purchase transaction information supplied by kiosk 320 further ensures that the screen 400 displays descriptions of retail items the subject of the current purchase transaction, as well. In an embodiment, upon display of this current-purchase information, one or more older sales transaction description(s) 410, 420 may transition off of the screen 400.

Referring back to FIG. 3, each of the display devices 330a, 330b are positioned such that the screen 400 is unobscured and viewable by all parties present in the retail space 300 no matter where in the retail space such parties may be positioned. Display devices 330a, 330b are further configured to display the descriptions 410, 420 in a font size that ensures that the descriptions are legible to all such parties having normal corrected or uncorrected vision. In an embodiment, at least one of the display devices, for example and in particular display device 330b is arranged such that the descriptions of retail items displayed on the screen 400 are viewable through door 360, for example, by all parties outside of, but within a predetermined distance from, the retail space 300.

While the preferred embodiment of the invention has been illustrated and described, many changes can be made without departing from the spirit and scope of the invention. Accordingly, the scope of the invention is not limited by the disclosure of the preferred embodiment. Instead, the scope of the invention should be determined entirely with reference to the claims.

What is claimed is:

1. A system, comprising:
   a transaction-processing kiosk located in a predefined retail space, the kiosk configured to enable a first human user to execute a current purchase transaction involving at least one of a set of retail items selected from the predefined retail space, the current purchase transaction being executed without participation by a second human; and
   at least one display device having a screen and in signal communication with the kiosk, the at least one display device being configured such that the screen simultaneously displays a predetermined number of descriptions of retail items the subject of purchase transactions with the kiosk in which a plurality of human users different from the first human user have successfully paid for the retail items prior to execution of the current purchase transaction, wherein the at least one display device is positioned such that the screen is viewable by all parties present in the retail space.

2. The system of claim 1, wherein the display is arranged such that the descriptions of retail items displayed on the screen are viewable by all parties outside of, but within a predetermined distance from, the retail space.

3. The system of claim 1, further comprising at least one camera trained on the retail space.

4. The system of claim 1, wherein the display is configured such that the descriptions of retail items presented on the screen are legible to all parties present in the retail space.

5. The system of claim 1, wherein the retail space is enclosed by at least one wall.

6. The system of claim 1, wherein the screen displays descriptions of retail items the subject of the current purchase transaction.

7. A computer-readable medium on which are stored instructions that, when executed by a processing device located in a predefined retail space, wherein at least one display device having a screen and in signal communication with the processing device is in the retail space and is positioned such that the screen is viewable by all parties present in the retail space, enable the processing device to perform a method, the method comprising the steps of:
enabling a first human user to execute a current purchase transaction involving at least one of a set of retail items selected from the predefined retail space, the current purchase transaction being executed without participation by a second human, the retail space specifically excluding any human-attended checkout stations; and
generating to the at least one display device a predetermined number of descriptions of retail items the subject of purchase transactions with the processing device executed by a plurality of different human users prior to execution of the current purchase transaction, such that the screen simultaneously displays the descriptions.

8. The medium of claim 7, wherein the display is arranged such that the descriptions of retail items displayed on the screen are viewable by all parties outside of, but within a predetermined distance from, the retail space.

9. The medium of claim 7, wherein at least one camera is trained on the retail space.

10. The medium of claim 7, wherein the descriptions are generated such that the descriptions presented on the screen are legible to all parties present in the retail space.

11. The medium of claim 7, wherein the retail space is enclosed by at least one wall.

12. The medium of claim 7, wherein the method further comprises generating to the screen descriptions of retail items the subject of the current purchase transaction.

13. A processing-device-implemented method in a predefined retail space, wherein at least one display device having a screen and in signal communication with the processing device is in the retail space and is positioned such that the screen is viewable by all parties present in the retail space, the method comprising the steps of:
enabling a first human user to execute a first purchase transaction involving at least one of a set of retail items selected from the predefined retail space, the first purchase transaction being executed without participation by a second human; and
generating to the at least one display device a predetermined number of descriptions of retail items the subject of purchase transactions with the processing device in which a plurality of human users different from the first human user have successfully paid for the retail items prior to execution of the first purchase transaction, such that the screen simultaneously displays the descriptions.

14. The method of claim 13, wherein the display is arranged such that the descriptions of retail items displayed on the screen are viewable by all parties outside of, but within a predetermined distance from, the retail space.

15. The method of claim 13, wherein at least one camera is trained on the retail space.

16. The method of claim 13, wherein the descriptions are generated such that the descriptions presented on the screen are legible to all parties present in the retail space.

17. The method of claim 13, wherein the retail space is enclosed by at least one wall.

18. The method of claim 13, further comprising the step of generating to the screen descriptions of retail items the subject of the first purchase transaction.

19. The system of claim 1, wherein the at least one display device is located within the retail space.

* * * * *